United States Patent
Nordling

(10) Patent No.: US 7,580,712 B2
(45) Date of Patent: Aug. 25, 2009

(54) WIRELESS HIGH-SPEED DATA NETWORK PLANNING TOOL

(75) Inventor: Nikus Nordling, Knivsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 449 days.

(21) Appl. No.: 11/364,548

(22) Filed: Mar. 1, 2006

(65) Prior Publication Data

US 2006/0276195 A1  Dec. 7, 2006

Related U.S. Application Data

(60) Provisional application No. 60/686,931, filed on Jun. 3, 2005.

(51) Int. Cl.
  *H04Q 7/20* (2006.01)
(52) U.S. Cl. ........................... 455/446; 370/913
(58) Field of Classification Search ............ None
  See application file for complete search history.

(56) References Cited

U.S. PATENT DOCUMENTS

| | | | |
|---|---|---|---|
| 5,710,758 A | 1/1998 | Soliman et al. |
| 5,963,867 A | 10/1999 | Reynolds et al. |
| 6,111,857 A | 8/2000 | Soliman et al. |
| 6,169,881 B1 | 1/2001 | Astrom et al. |
| 6,173,067 B1 | 1/2001 | Payton et al. |
| 6,188,354 B1 | 2/2001 | Soliman et al. |
| 6,205,220 B1 | 3/2001 | Jacobson et al. |
| 6,216,010 B1 | 4/2001 | Edwards et al. |
| 6,246,880 B1 | 6/2001 | Iizuka |
| 6,356,531 B1 | 3/2002 | Soliman |
| 6,356,758 B1 | 3/2002 | Almeida et al. |
| 6,360,098 B1 | 3/2002 | Ganesh et al. |
| 6,445,912 B1 | 9/2002 | Cole et al. |
| 6,456,848 B1 | 9/2002 | Freeman et al. |
| 6,466,797 B1 | 10/2002 | Frodigh et al. |
| 6,477,155 B1 | 11/2002 | You |
| 6,487,414 B1 | 11/2002 | Tanay et al. |
| 6,505,045 B1 | 1/2003 | Hills et al. |
| 6,539,228 B1 | 3/2003 | Tateson |
| 6,549,781 B1 | 4/2003 | O'Byrne et al. |
| 6,556,832 B1 | 4/2003 | Soliman |
| 6,628,944 B1 | 9/2003 | Jeong et al. |
| 6,631,267 B1 | 10/2003 | Clarkson et al. |
| 6,636,743 B1 | 10/2003 | Vicharelli et al. |

(Continued)

OTHER PUBLICATIONS

Granbohm et al, "GPRS-General Packet Radio Service", Ericsson Review, No. 2, 1999, pp. 82-88.

(Continued)

*Primary Examiner*—Lester Kincaid
*Assistant Examiner*—Phuoc Doan
(74) *Attorney, Agent, or Firm*—Nixon & Vanderhye, P.C.

(57) ABSTRACT

Tools and methods are provided to model and simulate the high-speed data channel and the traffic scheduling function, and tools and methods to simultaneously simulate the high-speed data channel and other voice and data services sharing the same radio carrier. The tools and methods estimate the quality of service and the capacity of the high-speed data channel, and also estimate the impact of the high-speed data channels on the quality of service and traffic capacity of other voice and data services on the same radio channel. The tools and method can be used in a wireless network planning tool to analyze a network that uses a radio carrier exclusively for high-speed data channels, such as cdma2000 EV-DO. The tools and method can also be used to analyze a network that combines high-speed data channels and CDMA based services on the same radio carrier, such as cdma2000 EV-DV or WCDMA HSDPA.

22 Claims, 5 Drawing Sheets

U.S. PATENT DOCUMENTS

| | | |
|---|---|---|
| 6,639,904 B1 | 10/2003 | Boyer et al. |
| 6,640,089 B1 | 10/2003 | Kanaan et al. |
| 6,711,148 B1 | 3/2004 | Hills |
| 6,721,769 B1 | 4/2004 | Rappaport et al. |
| 6,785,547 B1 | 8/2004 | Heiska et al. |
| 6,810,246 B1 | 10/2004 | Kalofonos et al. |
| 6,842,482 B1 | 1/2005 | Hiramatsu |
| 6,842,726 B1 | 1/2005 | Scharosch et al. |
| 6,850,946 B1 | 2/2005 | Rappaport et al. |
| 6,871,073 B1 | 3/2005 | Boyer et al. |
| 6,892,073 B2 | 5/2005 | Fattouch |
| 6,917,816 B2 | 7/2005 | Abed et al. |
| 6,925,066 B1 | 8/2005 | Chekuri et al. |
| 6,934,555 B2 | 8/2005 | Silva et al. |
| 6,940,838 B1 | 9/2005 | Stead |
| 6,952,181 B2 | 10/2005 | Karr et al. |
| 6,971,063 B1 | 11/2005 | Rappaport et al. |
| 6,973,622 B1 | 12/2005 | Rappaport et al. |
| 6,975,866 B2 | 12/2005 | Fattouch |
| 6,985,735 B2 | 1/2006 | Gustafsson |
| 2005/0018656 A1* | 1/2005 | Rudolf et al. ............... 370/352 |
| 2006/0274667 A1* | 12/2006 | Mir et al. .................... 370/252 |

OTHER PUBLICATIONS

Langer et al, "CDMA2000-A World Review", Ericsson Review, No. 3, 1999, pp. 150-158.

Skold et al, "Broadband Data Performance of Third-Generation Mobile Ssystems", Ericsson Review, No. 1, 2005.

* cited by examiner

Example Monte Carlo Simulation for Estimating Scheduling Gain

WIRELESS HIGH-SPEED DATA NETWORK PLANNING TOOL

This application claims the benefit and priority of U.S. Provisional Patent Application 60/686,931 filed Jun. 3, 2005, which is incorporated herein by reference in its entirety.

BACKGROUND

1. Field of the Invention

This application pertains to the planning and design of wireless networks, and particularly to wireless networks which provide or enable high speed downlink packet access.

2. Related Art and Other Considerations

In a typical cellular radio system, mobile terminals (also known as mobile stations and mobile user equipment units (UEs)) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

Wireless network design is usually performed by means of a computer based planning tool. Several different radio access technologies can be used for building wireless networks, such as frequency division multiple access (FDMA), time division multiple access (TDMA), and code-division multiple access (CDMA). The computer based planning tools of today are capable of planning one or more of these technologies, one at a time, and may also be capable of co-planning two or more networks using the same technology or different technologies.

Computer based wireless network planning tools use digital terrain data to predict radio wave propagation, which is needed to estimate the radio coverage of the projected radio base stations. The traffic load at every radio base station can be input by the planner and/or estimated from geographic and demographic information. The planning tool then predicts the resulting quality of service and traffic capacity in each radio base station for the wireless speech and data services. The prediction can be performed by means of a combination of calculation, table look-up and simulation. The predicted quality of service and capacity is used for testing and optimizing the wireless network design.

Computerized wireless network planning for a CDMA is disclosed in U.S. Pat. No. 5,710,748 to Soliman et al. (which is incorporated by reference herein). Other examples of network planning include the following US patents (all of which are incorporated by reference herein):

| | | | |
|---|---|---|---|
| 6,985,735 | 6,975,866 | 6,973,622 | 6,971,063 |
| 6,952,181 | 6,940,838 | 6,934,555 | 6,925,066 |
| 6,917,816 | 6,892,073 | 6,871,073 | 6,850,946 |
| 6,842,726 | 6,842,482 | 6,810,246 | 6,785,547 |
| 6,721,769 | 6,711,148 | 6,640,089 | 6,639,904 |
| 6,636,743 | 6,631,267 | 6,628,944 | 6,556,832 |
| 6,549,781 | 6,539,228 | 6,505,045 | 6,487,414 |
| 6,477,155 | 6,466,797 | 6,456,848 | 6,445,912 |
| 6,360,098 | 6,356,758 | 6,356,531 | 6,246,880 |
| 6,216,010 | 6,205,220 | 6,173,067 | 6,188,354 |
| 6,169,881 | 6,111,857 | 5,963,867 | |

In wireless networks based on CDMA, there is a complex interaction between wanted signals and interference, which usually makes a simulation necessary. The simulation involves several random trials, each with a different random distribution of the mobile terminals over the geographic area that is covered by the projected radio base stations. This is known as a Monte Carlo simulation.

To analyze a network based on CDMA, a wireless network planning tool usually performs the following steps.

Step 1. Define the wireless network including sites, cells, antennas, propagation models, and terrain data (digitally input)

Step 2. Predict the radio wave propagation from the base station antennas to the map bins (area units).

Step 3. Input or calculate the total output power and the received interference level, expressed as noise rise, for all cells. This can be done in several alternative ways as described below.

Step 4. Calculate the forward channel received desired power and interference values for all bins in the planned area, as well as the required reverse channel power for a hypothetic UE (user equipment) located in every bin. From these values, plots are generated for showing, for example, common pilot channel signal quality, forward and reverse channel coverage probability, and achieved data rate for different services in the bins.

Step 5. Calculate various data for the cells, such as average output power, noise rise, and forward and reverse channel load. Statistics are developed for the cells and for the planned area.

There are several methods to set or calculate the output power and noise rise values for the cells. The methods typically include (1) setting values for cells manually (e.g., via a graphical user interface (GUI)); importing total output power and noise rise values for the cells from a file (the values in the file may be derived from measurements or from a calculation tool, or may have been entered manually); estimating the values using table look-up; or estimating the values by Monte Carlo simulation.

As mentioned above, according to one method the total output power and noise rise values in all cells can be calculated by the wireless network planning tool from look-up tables. The input to the tables is the estimated traffic in the cell, which is calculated over the bins belonging to the cell. A bin can be considered to belong to the cell with the lowest pathloss or strongest received signal, as seen at the bin. To estimate the traffic in a cell, the expected forward and reverse channel traffic densities in the bins belonging to the cell are taken into account. The look-up tables are thus used to transform the traffic values into output power and noise rise values. Look-up tables for this purpose can be derived from measurements, simulations, or analytical calculations.

The Monte Carlo simulation method (also mentioned above) is intended to simulate a number of different random trials, each representing a possible random distribution of the traffic in the wireless network. In each trial, the UEs are spread over the planned area to simulate forward link and reverse link traffic load, using a random distribution function that gives a UE density equivalent to the desired average traffic intensity. Initial output power values and initial noise rise values are set for the cells, and these values used to calculate initial values for the interference received in the UEs. Each UE is connected to the best serving cell or cells (in soft handover), according to a ranking criterion such as lowest pathloss or highest received signal strength. The output power needed for the voice and data services in the cells is calculated, taking the interference at the UEs into account and adding the common channel power in every cell. The output power needed for the UEs is calculated, taking the noise rise values in the best serving cells into account. The received interference in the UEs is then calculated, as is the noise rise in the cells. Iterations are repeated until convergence is reached. Output, in the form of plots and statistics reports, can be generated from average values and statistical analysis of the simulation results.

The latest evolution of wireless networks comprises the use of the radio carrier for a high-speed data service. Characteristic for this kind of high-speed data service is that it adapts the data rate to the available transmitter power and the radio environment, rather than adapting the transmitter power to the radio environment, which would be necessary to maintain a constant data rate. The speed adaptation usually involves the selection of different modulation and/or coding schemes.

For GSM networks (based on the TDMA technology), the high-speed data service is known as GPRS and EGPRS (GPRS using EDGE). See, for example, Granbohm and Wiklund, GPRS—General packet radio system, *Ericsson Review*, No. 2, 1999, which is incorporated herein by reference.

For wireless networks based on the CDMA technology, the radio carrier may be used only for the high-speed data service, or may be shared between the high-speed data service and other wireless services. The first principle is implemented as cdma2000 EV-DO (evolution-data only), while the second principle is implementated either as cdma2000 EV-DV (evolution-data and voice) or WCDMA HSDPA (wideband CDMA high-speed downlink packet access). In these implementations, the network contains a traffic scheduling function that allows the high-speed forward (downlink) channel to be time-shared by several users. See, for example, Langer and Larsson, CDMA2000—A world view, *Ericsson Review*, No. 3, 2001; and Skold, Lundevall, Parkvall and Sundelin, Broadband data performance of third-generation mobile systems, *Ericsson Review*, No. 1, 2005, both of which are incorporated herein by reference.

In High Speed Downlink Packet Access (HSDPA), multiple users provide data to a high speed channel (HSC) controller that functions as a high speed scheduler by multiplexing user information for transmission over the entire HS-DSCH bandwidth in time-multiplexed intervals (called transmission time intervals (TTI)). The HSDPA system provides, e.g., a maximum data rate of about 10 Mbps. HSDPA achieves higher data speeds by shifting some of the radio resource coordination and management responsibilities to the base station from the radio network controller. Those responsibilities include one or more of the following: shared channel transmission, higher order modulation, link adaptation, radio channel dependent scheduling, and hybrid-ARQ with soft combining. In shared channel transmission, radio resources, like spreading code space and transmission power in the case of CDMA-based transmission, are shared between users using time multiplexing. A high speed-downlink shared channel is one example of shared channel transmission. One significant benefit of shared channel transmission is more efficient utilization of available code resources as compared to dedicated channels. Higher data rates may also be attained using higher order modulation, which is more bandwidth efficient than lower order modulation, when channel conditions are favorable.

High Speed Downlink Packet Access (HSDPA) is described, e.g., in 3GPP TS 25.435 V6.2.0 (2005-06), 3rd Generation Partnership Project; Technical Specification Group Radio Access Network; UTRAN $I_{ub}$ Interface User Plane Protocols for Common Transport Channel Data Streams (Release 6), which is incorporated herein by reference in its entirety. Also incorporated by reference herein as having some bearing on High Speed Downlink Packet Access (HSDPA) or concepts include: 3GPP TS 25.425 V6.2.0 (2005-06), 3rd Generation Partnership Project; Technical Specification Group Radio Access Network; UTRAN Iur interface user plane protocols for Common Transport Channel data streams (Release 6); and 3GPP TS 25.433 V6.6.0 (2005-06), 3rd Generation Partnership Project; Technical Specification Group Radio Access Network; UTRAN Iub interface Node B Application Part (NBAP) signaling (Release 6).

High Speed Downlink Packet Access (HSDPA) is also discussed in one or more of the following (all of which are incorporated by reference herein in their entirety):

U.S. patent application Ser. No. 11/024,942, filed Dec. 30, 2004, entitled "FLOW CONTROL AT CELL CHANGE FOR HIGH-SPEED DOWNLINK PACKET ACCESS";

U.S. patent application Ser. No. 10/371,199, filed Feb. 24, 2003, entitled "RADIO RESOURCE MANAGEMENT FOR A HIGH SPEED SHARED CHANNEL";

U.S. patent application Ser. No. 11/292,304, filed Dec. 2, 2005, entitled "FLOW CONTROL FOR LOW BITRATE USERS ON HIGH SPEED DOWNLINK";

PCT Patent Application PCT/SE2005/001247, filed Aug. 26, 2005;

PCT Patent Application PCT/SE2005/001248, filed Aug. 26, 2005.

Existing wireless network planning tools do not properly model the simultaneous use of a radio carrier for services based on CDMA and a high-speed data service with a traffic scheduling function. Therefore, the existing tools do not accurately estimate the impact of the high-speed data channels on the quality of service and traffic capacity of existing CDMA based services. Moreover, the tools do not accurately estimate the quality of service and the capacity of the high-speed data channel itself. This means that the tools cannot properly analyze wireless networks using cdma2000 EV-DO, cdma2000 EV-DV or WCDMA HSDPA.

What is needed, therefore, and an object of the present invention, are tools, methods, and techniques for designing, testing, and/or optimizing networks with high speed data channels.

SUMMARY

Tools and methods are provided to model and simulate the high-speed data channel and the traffic scheduling function, and tools and methods are provided to simulate simultaneously the high-speed data channel and other voice and data services sharing the same radio carrier. The tools and methods estimate the quality of service and the capacity of the high-speed data channel, and also estimate the impact of the high-speed data channels on the quality of service and traffic capacity of other voice and data services on the same radio channel. The tools and methods can be used in a wireless network planning tool to analyze a network that uses a radio carrier exclusively for high-speed data channels, such as cdma2000 EV-DO. The tools and methods can also be used to analyze a network that combines high-speed data channels and CDMA based services on the same radio carrier, such as cdma2000 EV-DV or WCDMA HSDPA.

The tools and methods involve performance/execution of steps such as the following: (1) assigning total output power values for plural cells of a modeled wireless communications network; (2) distributing plural user equipment units among the plural cells; (3) determining, for a first cell, transmit power needed for services and channels in the first cell other than power for a high speed downlink packet service; (4) using needed transmit power as determined by step (3) for determining power available in the first cell for the high speed downlink packet service; (5) using power available as determined by step (4) for determining received power at a first user equipment unit on a high speed downlink packet service data channel; (6) determining total interference received by the first user equipment unit from the plural cells; (7) using received high speed service data channel power as determined by step (5) and total interference as determined by step (6) for determining a high speed downlink packet service data rate for the first user equipment unit; and, (8) performing step (5) through step (7) for the plural user equipment units in the first cell and using the high speed downlink packet service data rates for the plural user equipment units to obtain a high speed downlink packet service data rate for the first cell. The tools and methods further comprise generating an output reflective of the high speed downlink packet service data rate for the first cell.

In one example implementation of the tools and method, step (6) includes determining the total interference for the plural cells using a high speed downlink packet service activity factor. The high speed downlink packet service activity factor is related to demand for the high speed downlink packet service by plural user equipment units in at least one of the plural cells. For example, the high speed downlink packet service activity factor for the first cell can be determined by dividing an average data rate demanded by the plural user equipment units in the first cell by the high speed downlink packet service data rate for the first cell.

In the same or another example implementation of the tools and method, step (7) further involves using a scheduling gain factor for determining the high speed downlink packet service data rate for the first user equipment unit. The scheduling gain factor can results from using an intelligent scheduler that takes advantage of fluctuations in a signal-to-interference ratio, and can itself involve a Monte Carlo simulation.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
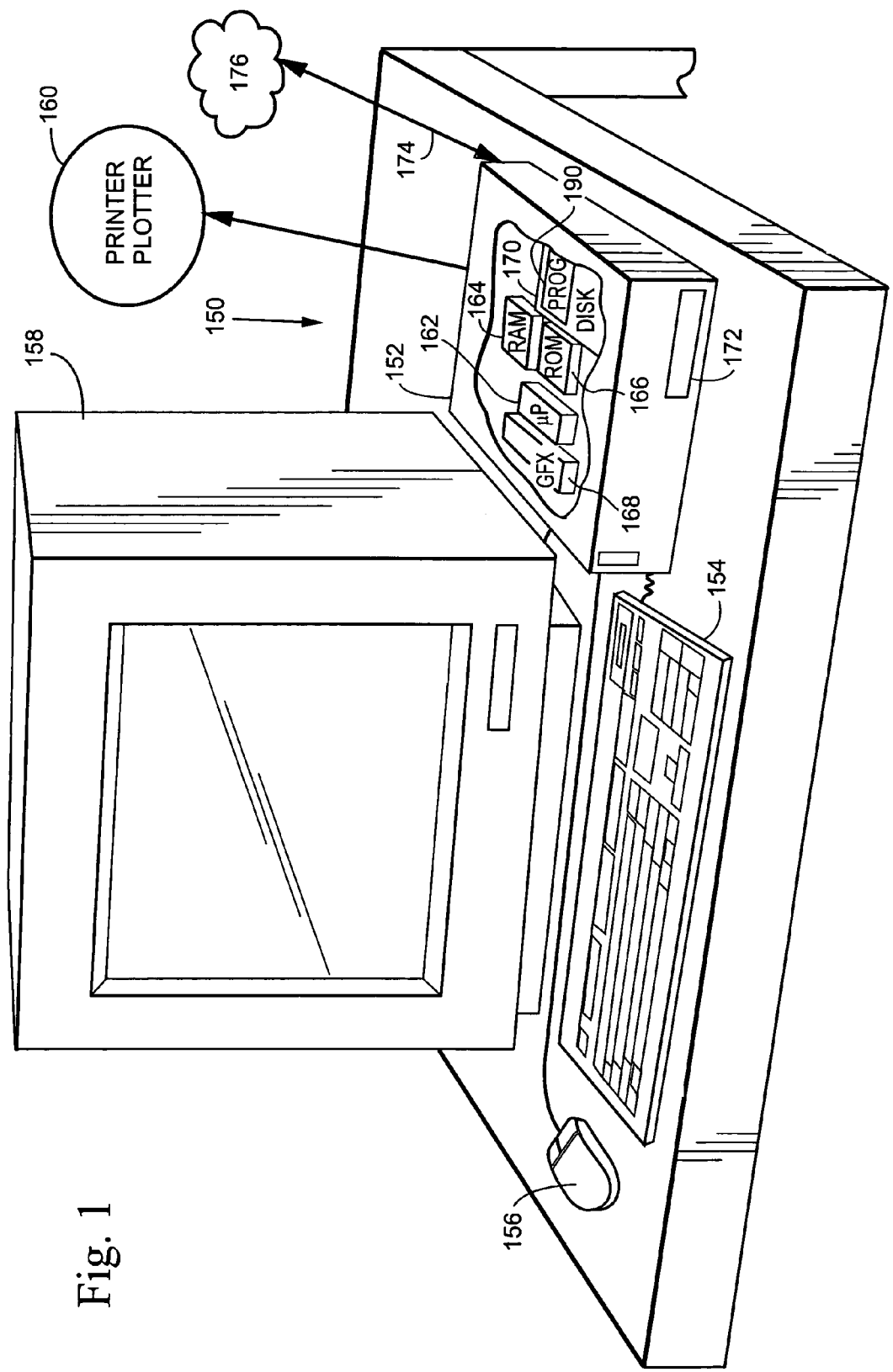
FIG. 1 is a schematic view of an example embodiment of a computer workstation capable of executing a network planning tool which models, e.g., a high speed packet service.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicity shown.

The functions of the various elements including functional blocks labeled as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

A network planning tool having embodiments such as those described herein provides new methods to estimate the power used for the high-speed (HS) data channel in the cells, and to estimate the total output power of the cells. The network planning tool also provides methods to model the HS channel scheduling function with less or more detail. To facilitate an understanding of a wireless network of the type which can be planned (or designed, or tested, or optimized) by the network planning tool, a brief description is first provided of such an example radio access network with reference to FIG. 2. Although the particular example network described in FIG. 2 happens to be a UTRAN network, it will be appreciated by the person skilled in the art that other types of networks, such as a GSM network, can be designed by the herein described network planning tool.

Figure 2:
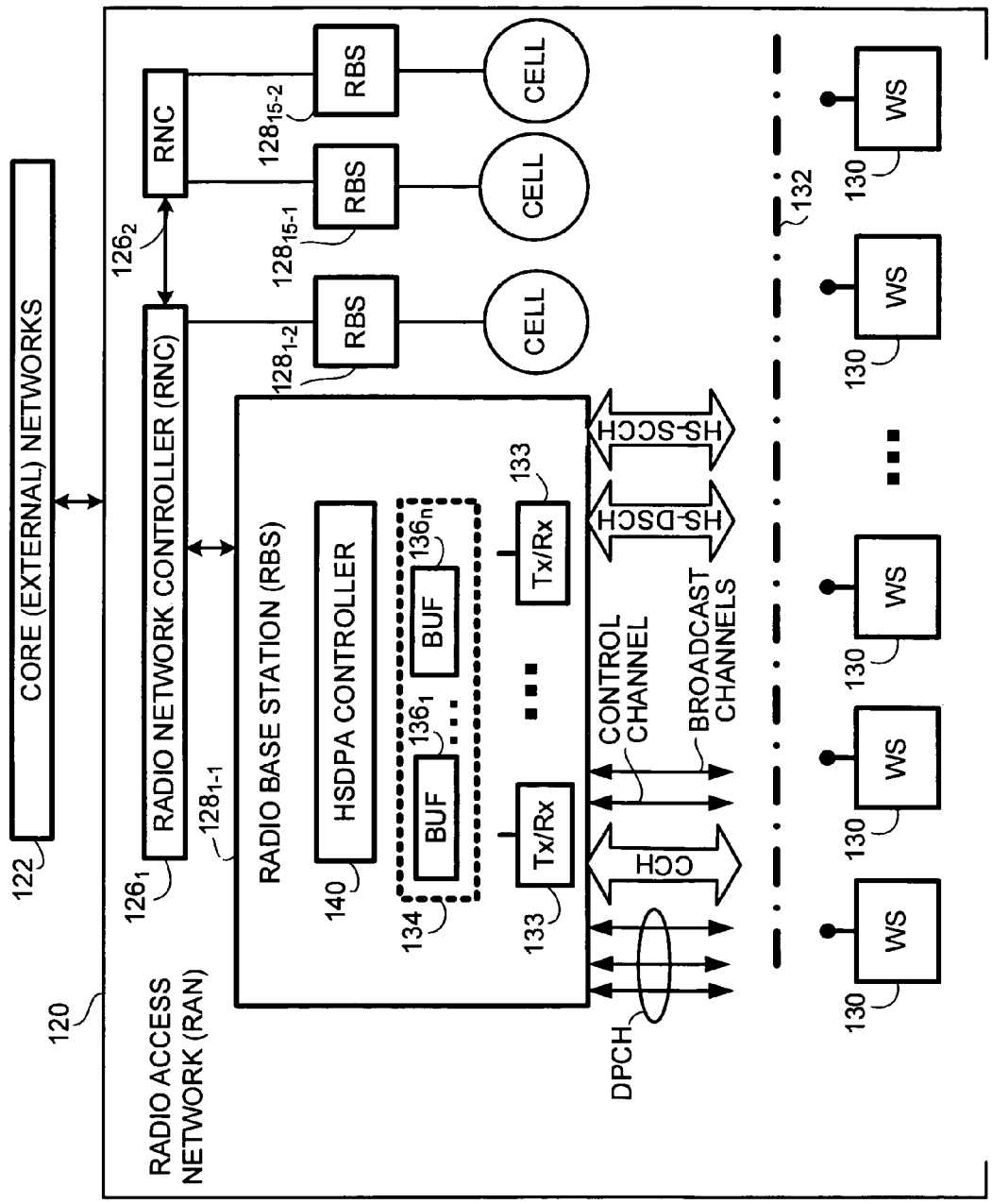
FIG. 2 is schematic view of example communications system in which a high speed packet service such as High Speed Downlink Packet Access (HSDPA) may be advantageously employed.

FIG. 2 thus shows one example mobile communications system in which High Speed Downlink Packet Access (HS-DPA) may be advantageously employed. FIG. 2 illustrates an example, non-limiting telecommunications system wherein a radio access network 120 is connected to one or more external (e.g., core) networks 122. The external networks 122 may comprise, for example, connection-oriented networks such as the Public Switched Telephone Network (PSTN) and/or the Integrated Services Digital Network (ISDN), and/or connectionless external core network such as (for example) the Internet. One or more of the external networks have unillustrated serving nodes such as, e.g., a Mobile Switching Center (MSC) node and a Serving General Packet Radio Service (GPRS) Support node (SGSN) working in conjunction with a Gateway GRPS Support Node (GGSN). Each of the core network service nodes connects to the radio access network (RAN) 120 over a suitable interface.

In the particular, non-limiting example shown in FIG. 2, the radio access network (RAN) 120 is a UMTS Terrestrial Radio Access Network (UTRAN) and the interface with the external network is over the Iu interface. The radio access network (RAN) 120 includes one or more radio network controllers (RNCs) 126 and one or more radio base stations (RBS) 128. For sake of simplicity, the radio access network (RAN) 120 of FIG. 2 is shown with only two RNC nodes, particularly RNC $126_1$, and RNC $126_2$. Each RNC 126 is connected to one or more base stations (BS) 128 over an Iub interface. For example, and again for sake of simplicity, two base station nodes are shown connected to each RNC 126. In this regard, RNC $126_1$, serves base station $128_{1-1}$ and base station $128_{1-2}$, while RNC 1262 serves base station $128_{2-1}$ and base station $128_{2-2}$. It will be appreciated that a different number of base stations can be served by each RNC, and that RNCs need not serve the same number of base stations. Moreover, FIG. 2 shows that an RNC can be connected over an Iur interface to one or more other RNCs in the UTRAN 124. Further, those skilled in the art will also appreciate that a base station is sometimes also referred to in the art as a radio base station, a node B, or B-node. It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signaling.

In FIG. 2, for sake of simplicity each base station 128 is shown as serving one cell. For base station $128_{1-2}$, for example, the cells are represented by a circle. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers. As shown in FIG. 2, wireless stations 130 communicates with one or more cells or one or more base stations (BS) 128 over a radio or air interface 132.

FIG. 2 further illustrates in simplified form that different types of channels may exist between one of the base stations 128 and wireless station 130 for transport of control and user data. For example, in the forward or downlink direction, there are several types of broadcast channels, one or more control channels, one or more common traffic channels (CCH), dedicated traffic channels (DPCH), and the high-speed downlink shared channel (HS-DSCH). The downlink dedicated physical channel (DPCH) carries both the Dedicated Physical Data Channel (DPDCH) and the Dedicated Physical Control Channel (DPCCH). A high-speed shared control channel (HS-SCCH) is utilized for signaling purposes.

Each base station (BS) 128 includes various constituent elements, including one or more transceivers 133. The transceivers 133 are employed for radio communication with the wireless stations 130 across the air interface 132, both for downlink communication from the base station 28 to the user equipment unit (UE) 130, and for uplink communication from the user equipment unit (UE) 130 to the radio base station 128.

In addition, for base stations having HSDPA capability, the base station 128 comprises a pool 134 of buffers 136 which store HS packets. Some of the buffers 136 store HS packets destined on the downlink to the user equipment unit (UE) 130; others of the buffers 136 store HS packets obtained on the uplink from the user equipment unit (UE) 130.

For HSDPA-capable nodes, a HSDPA controller 140, commonly referred to also as a HSDPA scheduler, is provided at the base station 128. The HS-SCCH contains information which is sent to the wireless terminals so that the wireless terminals know if they have data to receive on the HS-PDSCh channel or not. The high-speed downlink shared channel (HS-DSCH) and the high-speed shared control channel (HS-SCCH) are separate channels. As understood by those skilled in the art, the signaling carried by the high-speed shared control channel (HS-SCCH) is performed by transmitting the HS-SCCH TTI two slots in advance of the corresponding HS-DSCH TTI. The HSDPA controller 140 may be included with or separate from a node controller or the like which bears responsibility for overall operation/coordination of the RBS node. Various functionalities of HSDPA controller 140 and HSDPA-related entities of radio base station 128 not described herein are understood with reference to U.S. patent application Ser. No. 11/024,942, filed Dec. 30, 2004, entitled "FLOW CONTROL AT CELL CHANGE FOR HIGH-SPEED DOWNLINK PACKET ACCESS"; which is incorporated herein by reference. The person skilled in the art understands that the radio access network nodes such as the RNC 126 and the base station nodes 128 comprise other constituent elements, the nature and extent of which dependent upon characteristics of the respective nodes.

FIG. 1 shows an example, non-limiting computer workstation 150 suitable for executing a network planning tool as described herein. Workstation 150 includes a general purpose computer 152 and one or more of a keyboard 154, a mouse pointing device 156, a display 158, and a printer/plotter 160. Computer 152 may be, for example, a conventional microcomputer which includes a microprocessor 162, random access memory 164, read only memory 166, a graphics video adapter 168, a mass storage device such as a magnetic disk 170, and a disk drive 172. Disk drive 172 may handle an optical and/or floppy diskette, compact disk (CD), or digital video disk (DVD), for example. Computer 152 displays images on display 158 (and/or prints the images on printer/plotter 160) in response to user inputs via keyboard 154 and/or mouse pointing device 156. The computer 152 creates images based on steps it performs under control of a computer program product 190 stored on mass storage device 170 and/or another storage media (e.g., an optical or magnetic disk, not shown) provided via drive 172. A communications connection 174 between computer 152 and a network 176 (e.g., the Internet) may be provided to allow the user to access information from the network and/or exchange information with another computer also connected to the network.

In the example implementation herein described, the computer program product 190 is a network planning tool which is capable of designing, planning, testing, and/or optimizing a wireless network. Accordingly, the network planning tool is also herein referenced as network planning tool 190, or (more simply) tool 190, or (even more simply) "tool".

The network planning tool 190 provides different methods to estimate the HS channel power and total output power. Methods to model the HS channel scheduling function are also encompassed by network planning tool 190.

Different methods to set or calculate the HS power and total output power for the cells are described briefly below. The reverse link calculations have been omitted here, but such calculations should be performed simultaneously in the way that was previously described with reference to conventional network planning tools.

Figure 3:
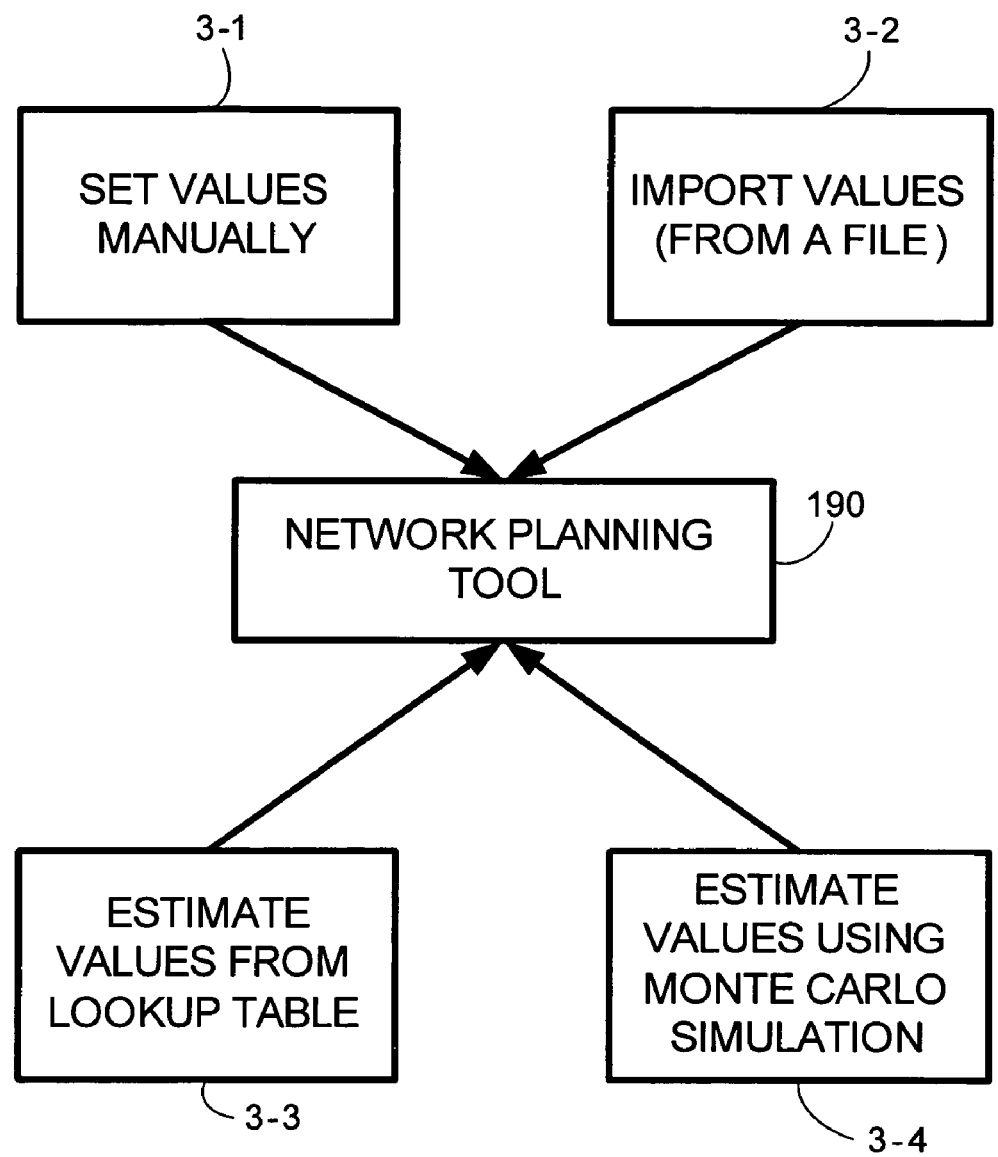
FIG. 3 is a diagrammatic view showing different ways of setting values for a network planning tool which models, e.g., a high speed packet service.

As illustrated in FIG. 3, there are various ways to set or calculate the HS power and total output power for the cells. Block 3-1 represents the setting values manually, e.g., total output power and noise rise values for the cells are input by the user via a graphical user interface (GUI) directly into the wireless network planning tool. Block 3-2 represents importation of values from a file, e.g., the HS power and total output power values for the cells are imported from the file. The values in the file may be derived from measurements or from a calculation tool, or may have been entered manually. Block 3-3 represents estimating values using a table look-up. Block 3-4 represents estimating values by Monte Carlo simulation Regarding block 3-3, the HS power and total output power in all cells is calculated by the wireless network planning tool from look-up tables. The input to the tables is the estimated HS and other traffic in the cell, which is calculated over the bins belonging to the cell. A bin can be considered to belong to the cell with the lowest pathloss or strongest received signal, as seen at the bin. To estimate the traffic in a cell, the expected HS and other traffic density in the bins belonging to the cell is taken into account. The look-up tables are thus used to transform the traffic values into HS power and total output power values. Look-up tables for this purpose can be derived from measurements, simulations, or analytical calculations.

Regarding block 3-4, a Monte Carlo simulation is simulates a number of different random trials, each representing a possible random distribution of the traffic in the wireless network. Output, in the form of plots and statistics reports, can be generated from average values and statistical analysis of the simulation results.

Figure 4:
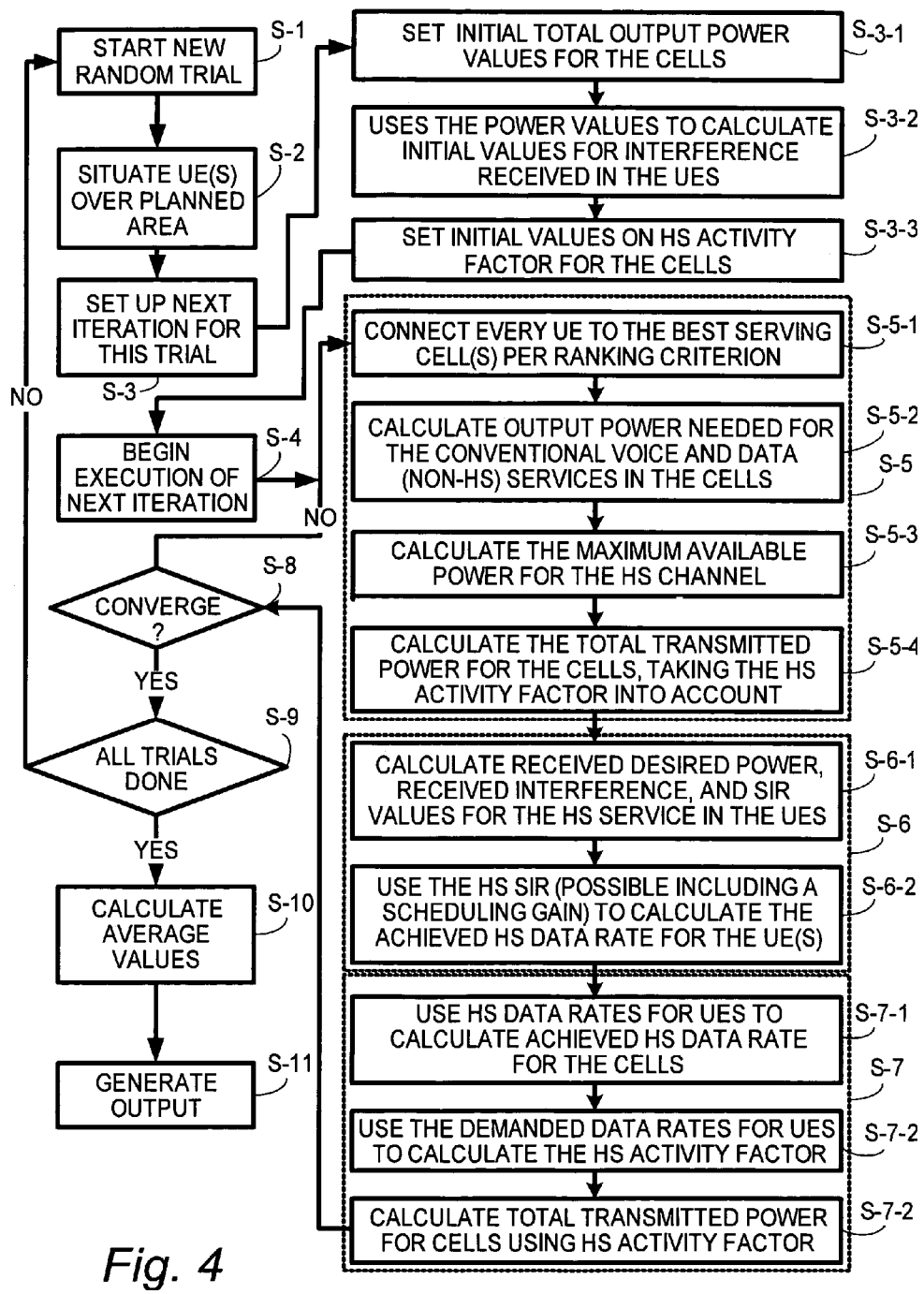
FIG. 4 is a flowchart showing example, non-limiting, steps or events performed by execution of an example embodiment of a network planning tool which models, e.g., a high speed packet service.

An example of such a Monte Carlo simulation to estimate the HS power and output power of the cells may be implemented by the example, basic, non-limiting steps illustrated in FIG. 4.

As Step S-1 of the simulation aspect of network planning tool 190, a new random trial is begun. At the beginning of execution of network planning tool 190, the new random trial is a first random trial As Step S-2, the high speed (HSDPA)-capable user equipment units (UE) and as well as other user equipment units (UE), e.g., non-HSDPA UEs, are situated or spread over the planned area to simulate HS and other traffic load. Preferably the situating or spreading of user equipment units (UEs) as part of Step S-2 uses a random distribution function that gives a UE density equivalent to the desired average traffic intensity.

Step S-3 involves setting up a new or next iteration for the current trial. Substep S-3-1 sets initial total output power values for the cells. Substep S-3-2 uses the power values set at Substep S 3-1 to calculate initial values for the interference received in the UEs. Substep S-3-3 sets initial values on a parameter known as the HS activity factor for the cells.

Step S-4 reflects actual commencement of the iteration which was set up as Step S-3. Execution of such iteration is reflected by Step S-5, Step S-6, Step S-7, and Step S-8. Step S-5 comprises Substep S-5-1 through Substep S-5-4; Step S-6 comprises Substep S-6-1 through Substep S-2; and Step S-7 comprises Substep S-7-1 through Substep S-7-2, all as illustrated in FIG. 4.

Concerning Step S-5, Substep S-5-1 involves connecting every UE to the best serving cell or cells (in soft handover), according to a ranking criterion. The ranking criterion can be, for example, lowest pathloss or highest received signal strength. Substep S-5-2 calculates the output power needed for the conventional voice and data (non-HS) services in the cells, taking the interference from both non-HS and HS services into account. In this regard, the quality and capacity of both non-HS services and HS services are dependent on the signal-to-interference ratio that can be achieved in the forward channel. The introduction of an HS service will increase the interference level in all UEs, and will thus degrade the quality and capacity also for non-HS services. To compensate for the higher interference, the power calculated in step S-5-2 in FIG. 4 will increase compared to a situation without the HS service. An example, non-limiting way of performing the calculation of Substep S-5-2 is provided by Expression 1 described below. Substep S-5-3 calculates the maximum available power for the HS channel. An example, non-limiting way of performing the calculation of Substep S-5-3 is provided by Expression 2 described below. Substep S-5-4 calculates the total transmitted power for the cells, taking the HS activity factor into account. Example, non-limiting ways of performing the calculation of Substep S-5-4 are provided by Expression 3 and Expression 4 described below.

Concerning Step S-6, Substep S-6-1 calculates the received desired power and interference, and the SIR values, for the HS service in the UEs. Example, non-limiting ways of performing the calculations of Substep S-6-1 are provided by Expression 6-Expression 11 described below.

Substep S-6-2 uses the HS SIR calculated at Substep S-6-1 (possibly including a scheduling gain) to calculate the achieved HS data rate for the UEs.

Concerning Step S-7, Substep S-7-1 uses the HS data rates for the UEs as calculated at Substep S-6-2 to calculate the achieved HS data rate for the cells (possibly including a scheduling gain). An example, non-limiting way of performing the calculation of Substep S-7-1 is provided by Expression 12 described below. Substep S-7-2 uses the demanded data rates for the UEs to calculate the HS activity factor. An example, non-limiting way of performing the calculation of Substep S-7-2 is provided by Expression 13 described below.

Step S-8 involves determining whether convergence criterion has been reached. The convergence criterion can be, for example, stable output power values for the non-HS services in all cells. If convergence has not been reached, a new iteration is begun and Step S-5 through Step S-8 are repeated.

At Step S-9 a determination is made whether the desired number of random trials have been finished. If all desired trials have not been executed, a new trial is started by returning execution to Step S-2 and repeating Step S-2 through Step S-9.

After all iterations have been completed, and after the desired number of random trials have been finished, and as an option, Step S-10 average values can be calculated. Step S-11 reflects generation of the results, such as the average values. The generated results can be provided in various ways and to various media. For example, the results can include plots and statistics which show performance of the HS channel, both for the map bins and for the cells, for example HS throughput in the cells (which is dependent on the scheduling method, as described below).

When analyzing a radio channel using the cdma2000 EV-DO technology, the calculations for conventional (non-HS) services are not needed.

A simplified version of this method may assume that the HS activity factor is always equal to 1, which means that the HS channel is always transmitting. However, such assumption may result in too high interference levels, and hence give a too pessimistic estimate of the system performance.

Example expressions which may be used in specific example Monte Carlo simulations for Step S-5 described above are Expression 1 through and including Expression 5. For example, for Substep S-5-2 the transmitter power (known as Linkpower and expressed in Watts (W)) needed for each of the non-HS connections can be calculated from Expression 1.

$$\text{Linkpower} = \text{Pathloss} * (C/I)\text{target} * \text{Interfallcells} \quad \text{Expression 1}$$

In Expression 1, Pathloss is the product of path loss and other losses divided by the antenna gain; (C/I) target is the desired signal to interference ratio for the connection; and Interfallcells is the sum of received interference power from all cells seen at the UE, including receiver noise but excluding orthogonal power (W), iteratively calculated as described for Step S-6 (see below).

For Substep S-5-3, the maximum available power for the HS channels (known herein as Hspower and expressed in watts (W)), is calculated from Expression 2.

$$\text{Hspower} = \text{Maxpower} - \text{Commonpower} - \text{Nonhspower} \quad \text{Expression 2}$$

In Expression 2, Maxpower is the maximum allowed transmitter power in the cell (W); Commonpower is the summed power for all common channels in the cell (W); and, Nonhspower is the sum of the Linkpower values in the cell (W).

The HS channels can be either on or off. Thus, for Substep S-5-4, the power transmitted from the cell (known as Cellpower and expressed in watts (W)) can be calculated using Expression 3 or Expression 4.

$$\text{Cellpower} = \text{Maxpower} \text{ (with a probability equal to Hsactivity)} \quad \text{Expression 3}$$

$$\text{Cellpower} = \text{Commonpower} + \text{Nonhspower} \text{ (with a probability equal to 1-Hsactivity).} \quad \text{Expression 4}$$

In Expression 3 and Expression 4, Hsactivity is the activity factor for the HS channels (see expressions for Step S-7 described below). The parameter Hsactivity for a cell is defined as the portion of time during which the HS channel has to be switched on to be able to transmit the demanded amount of data to the HS UEs that are connected to the cell. The calculation of Hsactivity is performed according to Expression 13.

The program tool may also calculate the average power transmitted from the cell (known as Cellavpower and expressed in watts (W)) using Expression 5. For the subsequent interference calculations, it is possible to use either the value of Cellpower as determined from one of Expression 3 or Expression 4 or the value of Cellavpower determined from Expression 5.

$$\text{Cellavpower} = \text{Commonpower} + \text{Nonhspower} + \text{Hsactivity} * \text{Hspower} \quad \text{Expression 5}$$

Example expressions which may be used in specific example Monte Carlo simulations for Step S-6 described above are Expression 6 through and including Expression 11. For example, for Substep S-6-1, the transmitted power on the HS data channel (Hsdatapower, expressed in watts), can be calculated using Expression 6. In Expression 6, Hssignalpower is the power transmitted on the HS signaling channel (W).

$$\text{Hsdatapower} = \text{Hspower} - \text{Hssignalpower} \quad \text{Expression 6}$$

Then the received HS power in one UE on the HS data channel (Hsrxpower, expressed in watts), can be calculated using Expression 7.

$$\text{Hsrxpower} = \text{Hsdatapower}/\text{Pathloss} \quad \text{Expression 7}$$

For Substep S-6-1, the received interference from one cell is calculated from Expression 8 or Expression 9.

$$\text{Interfpower} = \text{Cellpower}/\text{Pathloss} \quad \text{Expression 8}$$

$$\text{Interfpower} = \text{Cellavpower}/\text{Pathloss} \quad \text{Expression 9}$$

In every iteration, a new value of Interfallcells is calculated from Expression 10.

$$\text{Interfallcells} = \Sigma \text{Interfpower}(i) - \text{Orthopower} + \text{Receivernoise} \quad \text{Expression 10}$$

In Expression 10, the sum is taken over all cells (indexed by i) seen at the UE; Orthopower is the orthogonal part of the power received from the best serving cell (W); and Receivernoise is the receiver noise of the UE (in watts). The HS SIR value for Substep S-6-2 (Hssir) can then be calculated from Expression 11.

$$\text{Hssir} = \text{Hsrxpower}/\text{Interfallcells} \quad \text{Expression 11}$$

The value of the HS data rate for the UE, Hsuserrate (kbit/s) is then deduced from Hssir by table look-up. If a scheduling gain in dB is given, the Hssir value can be multiplied by the gain converted from dB to a factor, and the result shall be used as input to the table.

In the specific example Monte Carlo simulations for Step S-7 described above, for Substep S-7-1 the achieved HS data rate for the cell (Hscellrate, expressed in kbit/s), can be calculated using Expression 12.

$$\text{Hscellrate} = (1+\text{Gain}/100) * \Sigma \text{Hsuserrate}(j) * \text{Hsdemand}(j)/\Sigma \text{Hsdemand}(j) \quad \text{Expression 12}$$

In Expression 12, the sums are taken over all HS UEs (indexed by j) served by the cell. In Expression 12, Gain is the scheduling gain (%) [if a value in % is given, else set to 0]; and Hsdemand is the average data rate demanded by the UE (kbit/s).

For Substep S-7-2, the HS activity factor (Hsactivity) for the cell is calculated from Expression 13.

$$\text{Hsactivity} = \Sigma \text{Hsdemand}(j)/\text{Hscellrate} \quad \text{Expression 13}$$

In Expression 13, the sum is taken over all HS UEs (indexed by j) served by the cell. If the calculation results in a value exceeding 1, Hsactivity is set equal to 1.

Various steps discussed above refer to a factor known as scheduling gain. A conventional scheduling method typically involves a simple "Round-Robin" scheduling technique. However, more intelligent scheduling functions can instead be utilized and thereby provide "scheduling gain". The scheduling gain that is achieved by an intelligent scheduling function can increase the HS traffic capacity of a cell compared to the simple "Round-Robin" scheduling method. The Round-Robin scheduler transmits data from the cell to each connected HS UE at pre-determined time intervals, but an intelligent scheduling function tries to take advantage of the fluctuations in the signal-to-interference ratio (SIR) seen by different UEs. Due to fast fading, the SIR of the radio channel between the cell and several UEs will vary up and down, differently for each UE. Thus the intelligent scheduling function selects to transmit HS data to a specific UE while it has relatively good SIR, and to transmit to another UE while the first UE has bad SIR. The scheduling gain that is achieved in this way can be expressed either as the average improvement of the SIR (usually given in dB) for all HS UEs connected to the cell, or as the factor by which the average HS data rate in the cell can be increased (due to the improved SIR), relative to the Round-Robin method.

Thus, "scheduling gain" can be defined either as a capacity gain in percent (%) for the cell, or a signal quality gain in dB for the HS UE, which in turn results in higher data rate and higher cell capacity. Some different methods to set or calculate the scheduling gain for the cells or UEs can include setting the scheduling gain manually, estimating the scheduling gain by table look up, and estimating the scheduling gain by Monte Carlo simulation. Scheduling gain can thus be input into network planning tool 190 in ways similar to the input depicted in FIG. 3.

When setting values for scheduling gain manually, the scheduling gain (either in percent (%) for the cell or in decibels (dB) for the UEs is input by the user via the graphical user interface (GUI) directly into the wireless network planning tool.

The scheduling gain for a cell can also be calculated by the wireless network planning tool by means of a look-up table. The input to the look-up table is the estimated number of HS UEs, and the expected traffic demand of each UE, in the cell. The available HS power may also be taken into account. The look-up table for the selected scheduling method transforms the input values into a scheduling gain in percent for the cell or in decibels for the UEs. Look-up tables for this purpose can be derived from measurements, simulations, or analytical calculations.

Figure 5:
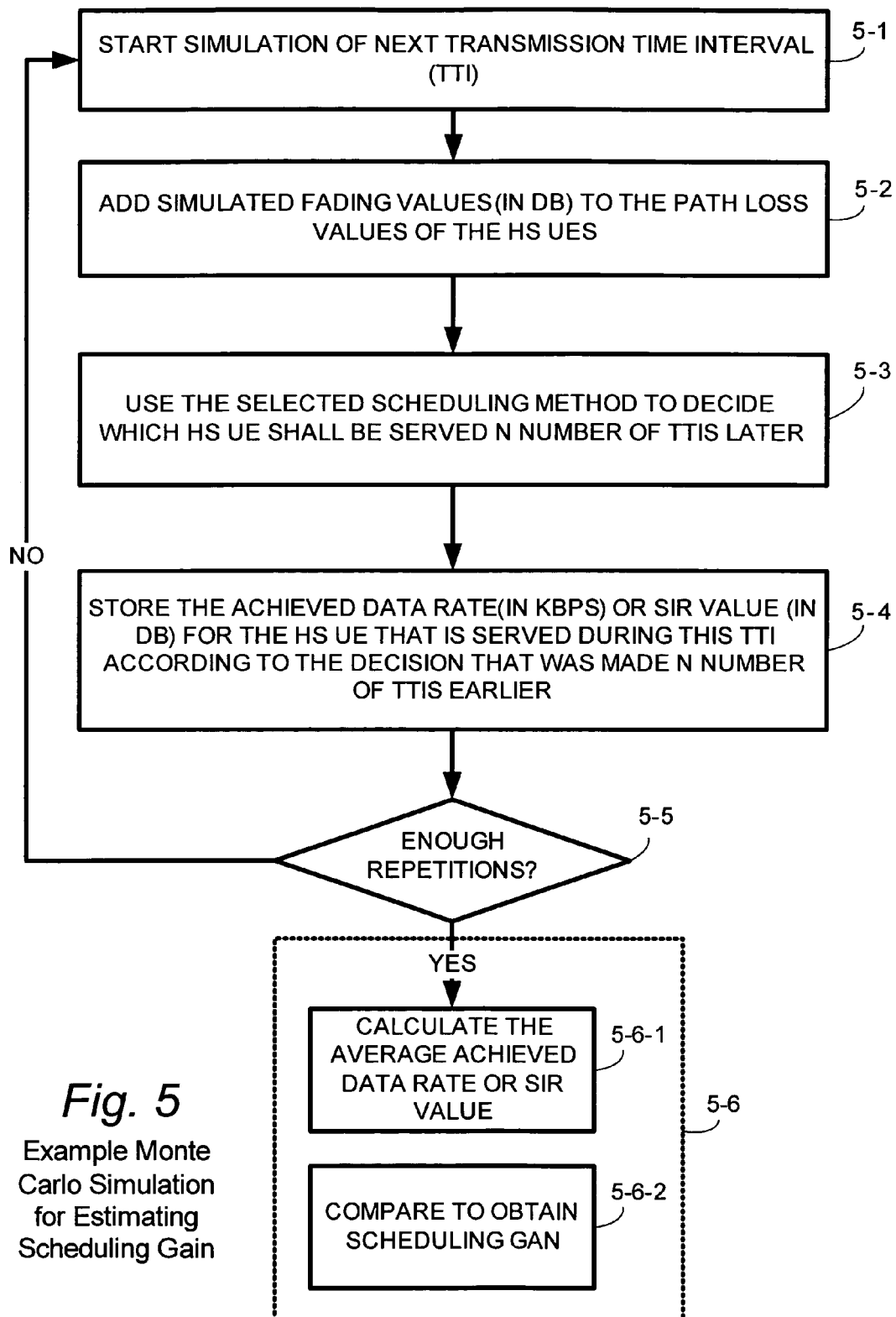
FIG. 5 is a flowchart showing example, non-limiting, steps or events performed by execution of an example embodiment of a network planning tool in conjunction with determining a scheduling gain.

Another way of estimating scheduling gain is by Monte Carlo simulation. Basic, example, non-limiting, representative steps or events for estimating scheduling gain is by Monte Carlo simulation are depicted in FIG. 5. The Monte Carlo simulation now described is intended to estimate the scheduling gain for the cells, and can be performed as a part of every random trial of the Monte Carlo simulation that is used to estimate output power values for the cells, as described above.

Each random trial in the simulation of FIG. 5 represents a transmission time interval (TTI) in the scheduling, for example a transmission time interval of 10 ms long. The scheduling decision that is made in one TTI cannot be effected until N number of TTIs later due to system delays (where N is a positive integer).

Step 5-1 of FIG. 5 reflects starting of simulation of a next transmission time interval (TTI). The first transmission time interval would be TTI #1.

Step 5-2 adds simulated fading values (in dB) to the path loss values of the HS UEs. Step 5-2 preferably uses a random distribution function that has the desired standard deviation and the desired spatial and temporal correlations for the fading.

Step 5-3 uses the selected scheduling method to decide which HS UE that shall be served N number of TTIs later. The scheduling method typically may take into account the SIR values and the amount of data waiting to be transmitted to each UE.

From TTI #1+N onwards, Step 5-4 stores the achieved data rate (in kbps) or SIR value (in dB) for the HS UE that is served during this TTI according to the decision that was made N number of TTIs earlier.

Step 5-5 determines whether Steps 5-2 through 5-4 have been repeated a desired number of times. If not, execution returns to Step 5-1. Otherwise, execution proceeds to Step 5-6.

Step 5-6 includes Substep 5-6-1 and Substep 5-6-2. Substep 5-6-1 calculates the average achieved data rate or SIR value. Substep 5-6-2 compares the average achieved data rate or SIR value with the corresponding value that would be achieved with no scheduling and no random fading to get the scheduling gain in percent for the cell or the scheduling gain in dB for the UEs.

The estimated scheduling gain such as that obtained from execution of the steps of FIG. 5 can then be used for the calculation of the HS throughput in the cells.

The technology described herein can be implemented in a wireless network planning tool. The tool can then be used to analyze any wireless network that uses a high-speed data channel with a scheduling function, such as cdma2000 EV-DO, and especially to analyze a network that combines a high-speed data channel with other voice and data services on the same radio carrier, such as cdma2000 EV-DV or WCDMA HSDPA.

The technology described herein improves the capabilities of wireless network planning tools by adding the functionality needed to test and optimize networks with high-speed data channels and CDMA based services on the same radio carrier, such as cdma2000 EV-DV or WCDMA HSDPA. This is achieved by using a method that accurately estimates both the impact of the high-speed data channels on the quality of service and traffic capacity of existing CDMA based services and the quality of service and capacity of the high-speed data channel itself.

The network planning methods as described herein can be implemented in ways other than an executable software program. For example, the method steps and operations described herein can also be implemented using individual hardware circuits. For embodiments which do employ executable software programs, it will be understood that such program can be executed by one or more suitably programmed digital microprocessors or general purpose computers, using application specific circuitry (ASIC), and/or using one or more digital signal processors (DSPs).

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

What is claimed is:

1. A computer readable medium encoded with a computer program which, when executed by a computer, serves as a network planning tool by performing steps of:
 (1) assigning total output power values for plural modeled cells of a modeled wireless communications network;
 (2) distributing modeled plural user equipment unit among the plural cells;

(3) determining, for a first modeled cell, transmit power needed for services and channels in the first modeled cell other than power for a high speed downlink packet service;

(4) using needed transmit power as determined by step (3) for determining power available in the first modeled cell for the high speed downlink packet service;

(5) using power available as determined by step (4) for determining received power at a modeled first user equipment unit on a high speed downlink packet service data channel;

(6) determining total interference received by the modeled first user equipment unit from the plural cells;

(7) using received high speed service data channel power as determined by step (5) and total interference as determined by step (6) for determining a high speed downlink packet service data rate for the modeled first user equipment unit;

(8) performing step (5) through step (7) for the plural modeled user equipment units in the modeled first cell and using the high speed downlink packet service data rates for the plural modeled user equipment units to obtain a high speed downlink packet service data rate for the modeled first cell;

generating an output which can be used for network planning.

2. The computer readable medium of claim 1, further comprising generating an output reflective of the high speed downlink packet service data rate for the modeled first cell.

3. The computer readable medium of claim 1, wherein step (4) comprises subtracting signaling power for the high speed downlink packet service from the needed transmit power.

4. The computer readable medium of claim 1, wherein step (6) includes determining the total interference for the plural modeled cells using a high speed downlink packet service activity factor, the high speed downlink packet service activity factor being related to demand for the high speed downlink packet service by the modeled plural user equipment units in at least one of the modeled plural cells.

5. The computer readable medium of claim 4, wherein the high speed downlink packet service activity factor for the modeled first cell is determined by dividing an average data rate demanded by the modeled plural user equipment units in the modeled first cell by the high speed downlink packet service data rate for the modeled first cell.

6. The computer readable medium of claim 1, wherein step (7) further involves using a scheduling gain factor for determining the high speed downlink packet service data rate for the modeled first user equipment unit.

7. The computer readable medium of claim 6, wherein the scheduling gain factor results from using an intelligent scheduler that takes advantage of fluctuations in a signal-to-interference ratio.

8. The computer readable medium of claim 7, wherein the scheduling gain factor is obtained either from a lookup table or by a Monte Carlo simulation.

9. The computer readable medium of claim 1, wherein determining the total interference of step (6) excludes an orthogonal part of the power received from a best serving cell of the modeled plural cells.

10. A method of modeling and testing a configuration of a wireless communications network comprising:

(1) assigning total output power values for modeled plural cells of a modeled wireless communications network;

(2) distributing plural user equipment unit among the modeled plural cells;

(3) using a computer to determine, for a modeled first cell, transmit power needed for services and channels in the modeled first cell other than power for a high speed downlink packet service;

(4) using needed transmit power as determined by step (3) for determining by the computer power available in the modeled first cell for the high speed downlink packet service;

(5) using power available as determined by step (4) for determining by the computer received power at a modeled first user equipment unit on a high speed downlink packet service data channel;

(6) using the computer to determine total interference received by the modeled first user equipment unit from the modeled plural cells;

(7) using received high speed service data channel power as determined by step (5) and total interference as determined by step (6) for determining by the computer a high speed downlink packet service data rate for the modeled first user equipment unit;

(8) performing step (5) through step (7) for the modeled plural user equipment units in the modeled first cell and using the high speed downlink packet service data rates for the modeled plural user equipment units to obtain a high speed downlink packet service data rate for the modeled first cell; and (9) generating by the computer and using an output for network planning.

11. The method of claim 10, further comprising generating an output reflective of the high speed downlink packet service data rate for the modeled first cell.

12. The method of claim 10, wherein step (4) comprises subtracting signaling power for the high speed downlink packet service from the needed transmit power.

13. The method of claim 10, wherein step (6) includes determining the total interference for the modeled plural cells using a high speed downlink packet service activity factor, the high speed downlink packet service activity factor being related to demand for the high speed downlink packet service by the modeled plural user equipment units in at least one of the modeled plural cells.

14. The method of claim 13, wherein the high speed downlink packet service activity factor for the modeled first cell is determined by dividing an average data rate demanded by the modeled plural user equipment units in the modeled first cell by the high speed downlink packet service data rate for the modeled first cell.

15. The method of claim 10, wherein step (7) further involves using a scheduling gain factor for determining the high speed downlink packet service data rate for the modeled first user equipment unit.

16. The method of claim 15, wherein the scheduling gain factor results from using an intelligent scheduler that takes advantage of fluctuations in a signal-to-interference ratio.

17. The method of claim 16, wherein the scheduling gain factor is obtained either from a lookup table or by a Monte Carlo simulation.

18. The method of claim 10, wherein determining the total interference of step (6) excludes an orthogonal part of the power received from a best serving cell of the modeled plural cells.

19. The computer readable medium of claim 1, further comprising performing a desired number of random trials, each of the random trials comprising performance of steps (1)-(8), and from the random trials calculating average values which can be used for generating the output which can be used for network planning.

20. The computer readable medium of claim 1, further comprising performing path loss predictions between the modeled first user equipment unit and all modeled cells seen by the modeled first user equipment unit.

21. The method of claim 10, further comprising performing a desired number of random trials, each of the random trials comprising performance of steps (1)-(8), and from the random trials calculating average values which can be used for generating the output which can be used for network planning.

22. The method of claim 10, further comprising performing path loss predictions between the modeled first user equipment unit and all modeled cells seen by the modeled first user equipment unit.

* * * * *

UNITED STATES PATENT AND TRADEMARK OFFICE
CERTIFICATE OF CORRECTION

PATENT NO. : 7,580,712 B2  Page 1 of 1
APPLICATION NO. : 11/364548
DATED : August 25, 2009
INVENTOR(S) : Nordling It is certified that error appears in the above-identified patent and that said Letters Patent is hereby corrected as shown below:

In Fig. 5, Sheet 5 of 5, for Tag "5-6-2", Line 2, delete "GAN" and insert -- GAIN --, therefor.

In Column 3, Line 40, delete "implementated" and insert -- implemented --, therefor.

In Column 6, Line 44, delete "explicity" and insert -- explicitly --, therefor.

In Column 7, Line 21, delete "GRPS" and insert -- GPRS --, therefor.

Signed and Sealed this

Ninth Day of March, 2010

David J. Kappos
*Director of the United States Patent and Trademark Office*